UNITED STATES PATENT OFFICE.

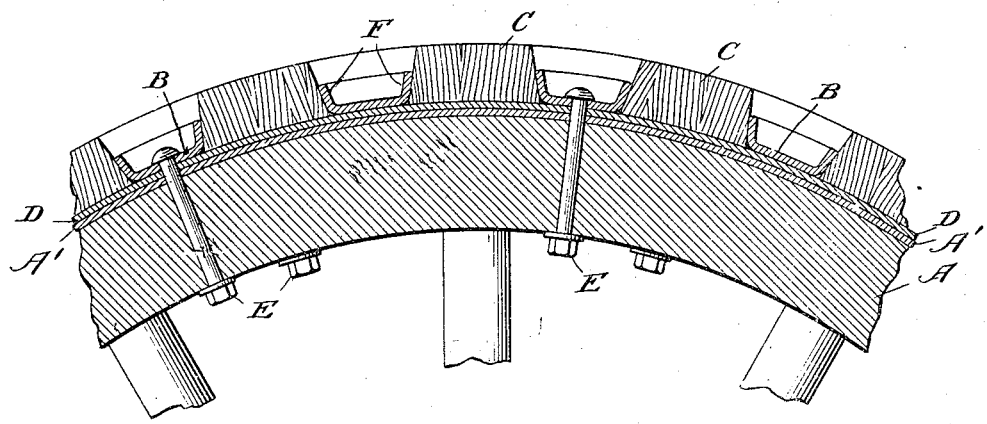
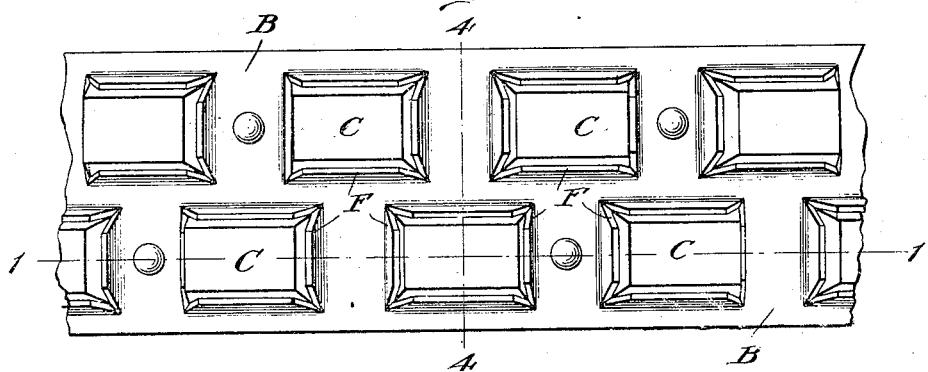
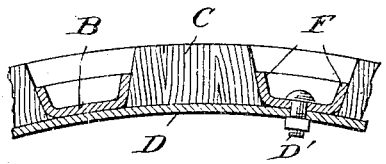
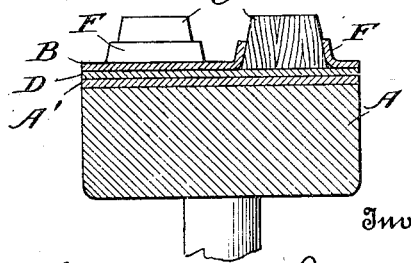

CHARLES FRANCIS JENKINS, OF WASHINGTON, DISTRICT OF COLUMBIA.

VEHICLE-TIRE.

1,197,030.  Specification of Letters Patent.  Patented Sept. 5, 1916.

Application filed June 27, 1913. Serial No. 776,189.

*To all whom it may concern:*

Be it known that I, CHARLES FRANCIS JENKINS, a citizen of the United States, residing at Washington, in the District of Columbia, have invented certain new and useful Improvements in Vehicle-Tires, of which the following is a specification, reference being had therein to the accompanying drawing.

The object of this invention is to produce a durable, nearly noiseless, non-slipping tire suitable for heavy vehicles requiring no great tire resiliency. To this end, the ordinary wheel is provided with a metal tire having around its periphery spaced blocks projecting equally.

In the accompanying drawings, Figure 1 is a sectional view of a portion of a wheel rim bearing my devices, the plane of section being indicated by the line 1—1, Fig. 2. Fig. 2 is a plan view of the same portion of the wheel. Fig. 3 is a view similar to Fig. 1 showing a portion of the tire detached from the wheel and ready for handling or shipment. Fig. 4 is a section on the line 4—4, Fig. 2.

In these figures, A represents the felly of a wheel provided with a common metal tire A', which may if desired be omitted, and B a primarily flat metal band or tire provided at intervals with socket openings in one or more circumferential rows, two rows being shown for illustration and the openings of one row being opposite the spaces between the blocks of the adjacent row, so that the openings, taken together, are staggered. Around each opening, the metal of the tire projects to form an outwardly tapering socket which joins the body of the band by a curve of small radius. As shown in this instance, the sockets are pyramidal and open at the four inclined angles, so that if the metal be properly selected for that result, the four sides F are slightly yielding and form short powerful springs. In each opening lies a closely fitting wood block C having radial grain and preferably forced into place in such manner that the walls of the socket are put under tension thereby. The base of each block is flush with the inner surface of the band or tire B and the smaller ends project to some distance, preferably uniform, beyond the sockets.

That the tire may be handled and shipped, independently of the wheel, without danger of losing the blocks, a band D of suitable material, such as canvas or metal, is secured within the band B and in contact with its surface. In the drawings, this band is shown as of metal and as held temporarily by bolts D' which, when the tire is put in place upon the wheel are replaced by longer bolts E passing inwardly through the felly.

The blocks are suited in number and size to the work to be put upon them and are usually treated with some suitable preservative.

Owing to the elasticity of the sockets under great force, the blocks may shrink and swell without at any time becoming loose, the spacing prevents slipping, the wear is slow, noise not objectionable, and the slight resiliency of the wood lessens shocks.

What I claim is:

1. The combination with a tire of spring metal having around its periphery a series of apertures bounded by outwardly projecting, converging springs integral with the body of the tire, of a corresponding series of tapered blocks fitting said apertures respectively, and yieldingly gripped between said springs.

2. The combination with a tire of spring metal having around its periphery a series of apertures bounded by outwardly projecting converging springs integral with the body of the tire, of a corresponding series of blocks fitting and filling the spaces bounded by the springs, normally holding the springs under tension, and projecting beyond the same, and an endless band covering and supporting the inner ends of the blocks.

3. The combination with a metal tire having around its periphery spaced openings each surrounded by outwardly converging resilient members integral with the tire and forming block sockets, of wood blocks fitting the sockets, respectively, projecting to a uniform distance beyond their outer ends and holding the converging members under tension.

4. The combination with a broad felly, of a metal tire encircling the same and provided with circumferential rows of polygonal openings each having at each side an external, inwardly inclined spring having a plane body and a curved portion merging into the tire body, and a series of blocks fitting the openings, respectively, projecting uniformly outward beyond the surrounding metal and pushing all said springs outward and holding them under constant tension although the blocks expand and contract.

5. The combination with a tire of thin spring metal provided with numerous perforations each having on pairs of opposite sides outwardly projecting, inwardly inclined integral spring lips, of outwardly tapered wood blocks fitting between the pairs of opposing lips, projecting outward beyond the same and constantly holding them outward beyond their normal positions.

6. The combination with the felly of a wheel, of numerous rectangular outwardly tapered wood blocks spaced around the felly, and a tire-like band of spring metal encircling the wheel and provided with sets of converging spring lips yieldingly gripping each block on all four sides.

In testimony whereof I affix my signature in presence of two witnesses.

CHARLES FRANCIS JENKINS.

Witnesses:
JAMES L. CRAWFORD,
ROBERT CRAIG GREENE.